United States Patent
Leung et al.

(10) Patent No.: US 11,855,791 B2
(45) Date of Patent: Dec. 26, 2023

(54) SLEEP AND WAKEUP SIGNALING FOR ETHERNET

(71) Applicant: Marvell Asia Pte, Ltd., Singapore (SG)

(72) Inventors: Ming-Tak Leung, Irvine, CA (US); Bizhan Abedinzadeh, Aliso Viejo, CA (US); Hon Wai Fung, Newark, CA (US); Liang Zhu, Shanghai (CN); Der-Ren Chu, Irvine, CA (US)

(73) Assignee: Marvell Asia Pte Ltd, Singapore (SG)

( * ) Notice: Subject to any disclaimer, the term of this patent is extended or adjusted under 35 U.S.C. 154(b) by 23 days.

(21) Appl. No.: 17/495,806

(22) Filed: Oct. 6, 2021

(65) Prior Publication Data
US 2022/0109583 A1    Apr. 7, 2022

Related U.S. Application Data

(60) Provisional application No. 63/088,726, filed on Oct. 7, 2020.

(51) Int. Cl.
G06F 1/00 (2006.01)
H04L 12/12 (2006.01)
G06F 1/3296 (2019.01)

(52) U.S. Cl.
CPC ............ H04L 12/12 (2013.01); G06F 1/3296 (2013.01)

(58) Field of Classification Search
CPC .............................. H04L 12/12; G06F 1/3296
See application file for complete search history.

(56) References Cited

U.S. PATENT DOCUMENTS

| | | | |
|---|---|---|---|
| 10,856,228 B1* | 12/2020 | Chu | H04W 52/0235 |
| 11,716,387 B2* | 8/2023 | Dees | H04L 69/22 |
| | | | 709/245 |
| 2012/0142328 A1 | 6/2012 | Awoniyi et al. | |
| 2012/0177361 A1 | 7/2012 | Hirano et al. | |
| 2017/0257468 A1* | 9/2017 | Jung | H04L 67/565 |
| 2018/0019902 A1* | 1/2018 | Suh | H04L 27/2607 |
| 2018/0020501 A1* | 1/2018 | Aboul-Magd | H04L 27/2603 |
| 2019/0268267 A1* | 8/2019 | Pignataro | H04L 45/741 |
| 2019/0297575 A1* | 9/2019 | Seok | H04W 52/0229 |
| 2020/0099611 A1* | 3/2020 | Filsfils | H04L 69/22 |

(Continued)

FOREIGN PATENT DOCUMENTS

EP        2566112 A1        3/2013

OTHER PUBLICATIONS

IEEE Std 802.3ch-2020 "IEEE Standard for Ethernet—Amendment 8: Physical Layer Specifications and Management Parameters for 2.5 Gb/s, 5 Gb/s, and 10 Gb/s Automotive Electrical Ethernet," IEEE Computer Society, pp. 1-207 (Jun. 30, 2020).

(Continued)

*Primary Examiner* — Mohammed H Rehman

(57) ABSTRACT

A first communication device generates an Operation, Administration, and Maintenance (OAM) frame that includes i) OAM message content and ii) an OAM frame header outside of the OAM message content, wherein generating the OAM frame comprises generating the OAM frame header to include information that signals one of i) a low power sleep (LPS) request, and ii) a wake-up request (WUR). The first communication device transmits the OAM frame to a second communication device via a communication medium to signal to the second communication device the one of i) the LPS request, and ii) the WUR.

8 Claims, 8 Drawing Sheets

(56) References Cited

U.S. PATENT DOCUMENTS

2021/0144082 A1* 5/2021 Bisht ...................... H04L 41/12
2022/0109583 A1* 4/2022 Leung ..................... H04L 12/12

OTHER PUBLICATIONS

International Search Report and Written Opinion for Application No. PCT/US2021/053847 dated Jan. 19, 2022 (12 pages).
"802.3bp Sleep/Wake-up Specification—Sleep/Wake-up Specification for Automotive Gigabit Ethernet," Draft 0.10, Open Alliance, pp. 1-23 (Jul. 28, 2021).
"Open Sleep/Wake-up Specification—TC10—Open Sleep/Wake-up Specification for Automotive Ethernet," Open Alliance, pp. 1-17 (Feb. 21, 2017).

* cited by examiner

FIG. 1

*Prior Art*

|  | D8 | D7 | D6 | D5 | D4 | D3 | D2 | D1 | D0 |
|---|---|---|---|---|---|---|---|---|---|
| Symbol 0 | Even Parity | Reserved | Reserved | Reserved | Reserved | PingRx | PingTx | SNR<1> | SNR<0> |
| Symbol 1 | Odd Parity | Valid | Toggle | Ack | TogAck | Message_Number<3:0> | | | |
| Symbol 2 | Odd Parity | Message<0><7:0> | | | | | | | |
| Symbol 3 | Odd Parity | Message<1><7:0> | | | | | | | |
| Symbol 4 | Odd Parity | Message<2><7:0> | | | | | | | |
| Symbol 5 | Odd Parity | Message<3><7:0> | | | | | | | |
| Symbol 6 | Odd Parity | Message<4><7:0> | | | | | | | |
| Symbol 7 | Odd Parity | Message<5><7:0> | | | | | | | |
| Symbol 8 | Odd Parity | Message<6><7:0> | | | | | | | |
| Symbol 9 | Odd Parity | Message<7><7:0> | | | | | | | |
| Symbol 10 | Odd Parity | CRC16 | | | | | | | |
| Symbol 11 | Odd Parity | CRC16 | | | | | | | |

Final bit (Symbol 11) — First bit (Symbol 0)

| | D9 | D8 | D7 | D6 | D5 | D4 | D3 | D2 | D1 | D0 | |
|---|---|---|---|---|---|---|---|---|---|---|---|
| Symbol 0 | Reserved | 0 | Reserved | Reserved | WUR 808 | LPS 804 | PingRx | PingTx | SNR<1> | SNR<0> | } OAM Frame Header 812 |
| Symbol 1 | Reserved | 1 | Valid | Toggle | Ack | TogAck | Message_Number<3:0> | | | | |
| Symbol 2 | Reserved | 1 | | | | Message<0><7:0> | | | | | |
| Symbol 3 | Reserved | 1 | | | | Message<1><7:0> | | | | | |
| Symbol 4 | Reserved | 1 | | | | Message<2><7:0> | | | | | |
| Symbol 5 | Reserved | 1 | | | | Message<3><7:0> | | | | | |
| Symbol 6 | Reserved | 1 | | | | Message<4><7:0> | | | | | |
| Symbol 7 | Reserved | 1 | | | | Message<5><7:0> | | | | | |
| Symbol 8 | Reserved | 1 | | | | Message<6><7:0> | | | | | |
| Symbol 9 | Reserved | 1 | | | | Message<7><7:0> | | | | | |
| Symbol 10 | Reserved | 1 | | | | Message<8><7:0> | | | | | |
| Symbol 11 | Reserved | 1 | | | | Message<9><7:0> | | | | | |
| Symbol 12 | Reserved | 1 | | | | Message<10><7:0> | | | | | |
| Symbol 13 | Reserved | 1 | | | | Message<11><7:0> | | | | | |
| Symbol 14 | RS(16,14) parity | | | | | | | | | | |
| Symbol 15 | RS(16,14) parity | | | | | | | | | | |

SLEEP AND WAKEUP SIGNALING FOR ETHERNET

CROSS REFERENCES TO RELATED APPLICATIONS

This application claims the benefit of U.S. Provisional Patent App. No. 63/088,726, entitled "WUR/LPS Signal Definition for 1000BaseT1 TC10 Operation," filed on Oct. 7, 2020, the disclosure of which is hereby expressly incorporated herein by reference in its entirety.

FIELD OF TECHNOLOGY

The present disclosure relates generally to communication technology, and more particularly to power saving techniques for devices that communicate via a communication link.

BACKGROUND

Technical Committee 10 (TC10) of the OPEN Alliance, has proposed mechanisms for one device to request, via an automotive communication link, one or more other devices to transition to a low power mode (sleep mode), and to instruct, via the automotive communication link, one or more other devices to transition to an active mode. For example, when the one device wants one or more other devices to transition to the sleep mode, the one device transmits a low power sleep (LPS) request via a communication link connected with a switch, and the switch propagates the LPS request to the one or more other devices. Similarly, when the one device wants one or more other devices to transition to the active mode, the one device transmits a wake-up request (WUR) to the switch via the communication link, and the switch propagates the WUR (or otherwise prompts the one or more other devices to transition to the active mode, such as by transmitting a wake-up pulse (WUP)).

FIG. 1 is a diagram of an Operation, Administration, and Maintenance (OAM) frame 100 as defined by the Institute for Electrical and Electronics Engineers (IEEE) 802.3bp Standard. The OAM frame 100 consists of 12 symbols (Symbol 0 through Symbol 11), each symbol consisting of eight data bits (D7 through D0) and a parity bit D8.

The Symbol 0 includes an even parity bit, four reserved bits, a Ping RX bit, a Ping TX bit, and two signal-to-noise ratio (SNR) bits.

The reserved bits (D4 through D7) are set to zero.

The communication device that transmits the OAM frame 100 sets the Ping TX bit and expects a link partner to echo the value of the Ping TX bit in another OAM frame transmitted by the link partner. The Ping RX bit is set to echo a Ping TX bit value in another OAM frame transmitted by the link partner.

The two SNR bits are set by the communication device to indicate an SNR level experienced by the communication device.

The Symbol 1 includes an odd parity bit, an OAM Message Valid (Valid) bit, an OAM Message Toggle (Toggle) bit, an OAM Message Acknowledge (Ack) bit, an OAM Message Toggle Acknowledge (TogAck) bit, and four OAM Message Number (Message_Number) bits.

The Valid bit is set to indicate whether the OAM frame 100 includes a valid OAM message.

The Toggle bit is used to ensure proper OAM message synchronization between the communication device and the link partner. The Toggle bit in the OAM frame 100 is set to an opposite value of a Toggle bit in a previously transmitted OAM frame that included another OAM message only if the link partner acknowledged that the other OAM message was received. Because the same OAM message may be repeatedly transmitted in multiple OAM frames, the Toggle bit helps to delineate a first OAM message from a different second OAM message.

The Ack bit set by the communication device to let the link partner know that an OAM message sent by the link partner was successfully received and that the communication device is ready to accept a new OAM message.

The TogAck bit is set by the communication device to let the link partner know which OAM message is being acknowledged. The TogAck bit is set to the value of the Toggle bit of the OAM message that is being acknowledged. The TogAck bit is valid only if Ack is set to 1.

The Message_Number bits are used to indicate a meaning of an eight byte OAM message that is included in the OAM frame 100. Because there are four Message_Number bits, up to 16 different types of OAM messages may be defined by a user. The values of the Message_Number bits are user-defined and not specified by the IEEE 802.3bp Standard.

Symbol 2 through Symbol 9 include the OAM message and respective odd parity bits. OAM messages are user-defined and not specified by the IEEE 802.3bp Standard.

Symbol 10 and Symbol 11 include a 16-bit cyclic redundancy check (CRC) field corresponding to a CRC generated using the 10 bytes included in Symbol 0 through Symbol 9 (i.e., not including the parity bits of Symbol 0 through Symbol 9). Symbol 10 and Symbol 11 also include respective odd parity bits.

During normal operation, one respective symbol of the OAM frame 100 is transmitted within one respective Reed-Solomon (RS) frame. In particular, one respective symbol of the OAM frame 100 is included in an OAM field of the respective RS frame. The twelve symbols of the OAM frame 100 are included in twelve consecutive and respective RS frames.

During a low power idle (LPI) mode of operation that comprises a quiet/refresh cycle, one respective symbol of the OAM frame 100 is included in a respective refresh period, and the twelve symbols of the OAM frame 100 are included in twelve consecutive and respective refresh periods.

The symbols of the OAM frame 100 are transmitted in order corresponding to the symbol numbers illustrated in FIG. 1, i.e., Symbol 0 is transmitted first in time, then Symbol 1, etc., and Symbol 11 is transmitted last in time, according to an embodiment. The bits of each symbol of the OAM frame 100 are transmitted in order corresponding to the bit numbers (D0, D1, etc.) illustrated in FIG. 1, i.e., D0 is transmitted first in time, then D1, etc., and D8 is transmitted last in time, according to an embodiment.

It has been proposed to TC10 that the LPS request and the WUR request be communicated within the OAM message content (e.g., at least in Symbol 2) of the OAM frame 100.

In 100Base-T1, the WUR and LPS signals are transmitted in gaps between data packets. In particular idle symbols transmitted in the gaps between data packets are encoded differently by selectively inverting a sequence of bits before mapping the bits to a ternary symbol to indicate a WUR signal or an LPS signal.

SUMMARY

In an embodiment, a first communication device comprises: a physical layer (PHY) processor comprising a transceiver, the PHY processor being configured to perform PHY functions associated with a communication link including transmitting first frames to a second communication device via a communication medium corresponding to the communication link and receiving second frames from the second communication device via the communication medium; and a controller configured to: generate an Operation, Administration, and Maintenance (OAM) frame that includes i) OAM message content and ii) an OAM frame header outside of the OAM message content, wherein generating the OAM frame comprises generating the OAM frame header to include information that signals one of i) a low power sleep (LPS) request, and ii) a wake-up request (WUR), and prompt the PHY processor to transmit the OAM frame to the second communication device via the communication medium to signal to the second communication device the one of i) the LPS request, and ii) the WUR.

In another embodiment, a method for communicating in a communication network includes: generating, at a first communication device, an OAM frame that includes i) OAM message content and ii) an OAM frame header outside of the OAM message content, wherein generating the OAM frame comprises generating the OAM frame header to include information that signals one of i) an LPS request, and ii) a WUR; and transmitting, by the first communication device, the OAM frame to a second communication device via a communication medium to signal to the second communication device the one of i) the LPS request, and ii) the WUR.

In yet another embodiment, a first communication device comprises: a PHY processor comprising a transceiver, the PHY processor being configured to perform PHY functions associated with a communication link including transmitting first frames to a second communication device via a communication medium corresponding to the communication link and receiving second frames from the second communication device via the communication medium; and a controller configured to: receive an OAM frame that was received by the PHY processor via the communication medium, the OAM frame having been transmitted to the first communication device from a second communication device via the communication medium, the OAM frame including i) OAM message content and ii) an OAM frame header outside of the OAM message content, and process the OAM frame header to determine whether the OAM frame header includes information that signals to the first communication device one of i) an LPS request, and ii) a WUR.

In still another embodiment, a method for processing communications in a communication network includes: receiving, at a first communication device, an OAM frame from a second communication device via a communication medium, the OAM frame including i) OAM message content and ii) an OAM frame header outside of the OAM message content; and processing, at the first communication device, the OAM frame header to determine whether the OAM frame header includes information that signals to the first communication device one of i) an LPS request, and ii) a WUR.

BRIEF DESCRIPTION OF THE DRAWINGS

FIG. 1 is a diagram of an Operation, Administration, and Maintenance (OAM) frame 100 as defined by the Institute for Electrical and Electronics Engineers (IEEE) 802.3bp Standard.

FIG. 8 is a diagram of another example OAM frame that is useable to signal an LPS request and to signal a WUR request, according to some embodiments.

DETAILED DESCRIPTION

Figure 2:
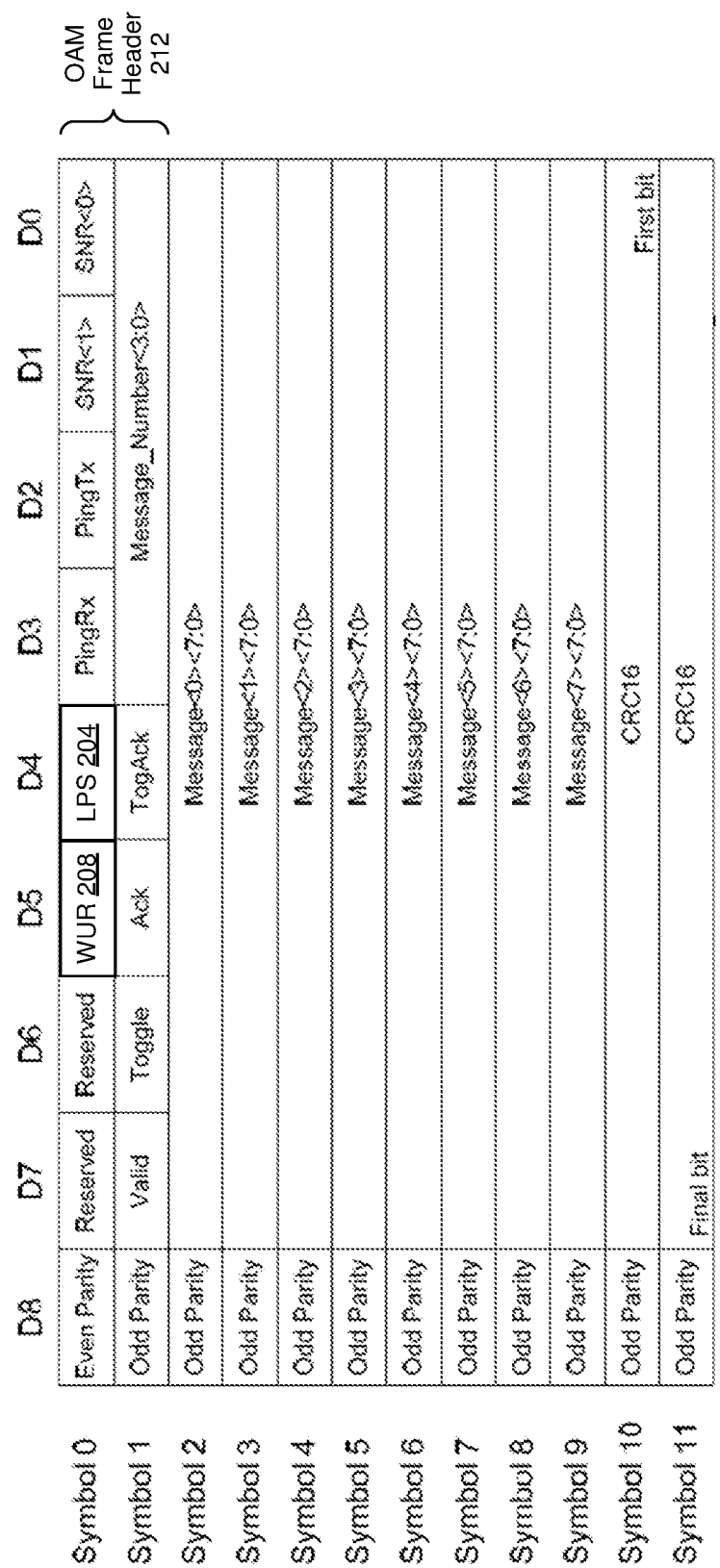
FIG. 2 is a diagram of an example OAM frame that is useable to signal an LPS request and to signal a WUR request, according to some embodiments.

As discussed above, it has been proposed to TC10 that the LPS request and the WUR request be communicated within the OAM message content (e.g., in Symbol 2) of the OAM frame 100 of FIG. 1. However, including the LPS/WUR request in the OAM message content of the OAM frame 100 results in an indefinite amount of delay in a link partner processing the LPS/WUR request. For example, when an OAM message is completely received at the link partner, the link partner places the OAM message in a queue. If the link partner is processing another OAM message when the LPS/WUR request is received, the LPS/WUR request will remain in the queue indefinitely until the link partner is ready to process the LPS/WUR request. On the other hand, it is desirable that the link partner be required to acknowledge an LPS request within a defined time period after a communication device transmits the LPS request so that the communication device can determine whether to abort the LPS request (e.g., the LPS request should be aborted if the link partner does not acknowledge the LPS request within the defined time period). If the link partner only processes the LPS request after an indefinite delay (e.g., while the link partner is processing another OAM message), the link partner will not know an accurate receive time of the LPS request and thus cannot determine when the acknowledgment of the LPS request must be transmitted. Similarly, if the link partner only processes the LPS request after an indefinite delay (e.g., while the link partner is processing another OAM message), the link partner may not be ready to transmit the acknowledgment of the LPS request until after the defined time period has expired.

Additionally, the IEEE 802.3bp Standard requires an OAM message to be repeatedly transmitted until the link partner acknowledges the OAM message. As a result, a communication device cannot transmit a new OAM message until a previous OAM message has been acknowledged by the link partner. If the LPS/WUR request is included in the OAM message content, there may be a delay between when a communication device determines that an LPS/WUR request should be transmitted and when the communication device is able to transmit the LPS/WUR request. For example, if the link partner has not yet acknowledged a previous OAM message, the communication device must wait to transmit the LPS/WUR request until the link partner transmits the acknowledgment of the previous OAM message.

Further, as discussed above, OAM message numbers and OAM messages are user-defined and are not specified by the IEEE 802.3bp Standard. Thus, if the LPS/WUR requests are defined as OAM messages having one or two corresponding OAM message numbers, the LPS/WUR requests may be incompatible with some existing OAM implementations with user-defined OAM messages that conflict with the LPS/WUR requests.

Also, as mentioned above, in 100Base-T1, WUR and LPS signals are transmitted as encoded idle symbols (i.e., selectively inverting a sequence of bits in the idle symbol to indicate a WUR signal or an LPS signal) transmitted in gaps between data packets. However, a descrambler at the link partner may have difficulty determining whether certain bits are truly inverted in an idle symbol due to ambiguities in the idle symbol from the standpoint of the descrambler.

In embodiments described below, bits in a first transmitted symbol of an OAM frame are used to signal WUR and LPS requests, as opposed to being included only in the OAM message content. Because the WUR/LPS request is not part of the OAM message content, a link partner receiving the WUR/LPS request can more accurately determine a receipt time of the WUR/LPS request (as compared to if the WUR/LPS request were included in the OAM message content, as discussed above), at least in some embodiments. Additionally, because the WUR/LPS request is not part of the OAM message content, a communication device is not required to wait to transmit the WUR/LPS request until the link partner has acknowledged a previous OAM message and thus the communication device can transmit the WUR/LPS request with less delay (as compared to if the WUR/LPS request were included in the OAM message content, as discussed above), at least in some embodiments. Further, because the WUR/LPS request is not part of the OAM message content, the WUR/LPS request signaling is compatible with existing user-defined OAM messages, at least in some embodiments.

Further, because the WUR/LPS request is signaled within an OAM frame, problems with WUR/LPS signaling using encoded idle symbols (discussed above) between data packets are avoided, at least in some embodiments.

FIG. 2 is a diagram of an example OAM frame 200 that is useable to signal an LPS request and to signal a WUR request, according to some embodiments. The OAM frame 200 is similar to the OAM frame 100 of FIG. 1, and fields and bits similar to the OAM frame 100 of FIG. 1 are not described in detail for purposes of brevity.

As illustrated in FIG. 2, bits D8 through D0 are arranged in an order corresponding to the bit numbers D8 through D0, i.e., D0 is a first bit in the bit order, D1 is a second bit in the bit order, etc., and D8 is a ninth bit in the bit order, according to an embodiment. The first bit (i.e., D0) is adjacent to the second bit (i.e., D1); the second bit is also adjacent to the third bit (i.e., D2) and is between the first bit and the third bit; the third bit is also adjacent to the fourth bit (i.e., D3) and is between the second bit and the fourth bit; etc. Thus, bit D4 is fifth in the bit order and bit D5 is sixth in the bit order, according to an embodiment, with bit D4 adjacent to and between bits D3 and D5, and with bit D5 adjacent to and between bits D4 and D6.

Symbol 0 includes i) an LPS bit 204 at location D4, and ii) a WUR bit 208 at location D5, i.e., the LPS bit 204 is fifth in the bit order and the WUR bit 208 is sixth in the bit order. In another embodiment, the LPS bit 204 is located at bit D5 and the WUR bit 208 is located at bit D4, i.e., the WUR bit 208 is fifth in the bit order and the LPS bit 204 is sixth in the bit order. In various other embodiments, the LPS bit 204 is one of bits D4-D7, and the WUR bit 208 is another one of the bits D4-D7, i.e., the LPS bit 204 is one of fifth through eighth in the bit order and the WUR bit 208 is another one of fifth through eighth in the bit order.

The LPS bit 204 is set to a first value to signal an LPS request and is set to a second value otherwise. In an embodiment, the first value is one and the second value is zero. In another embodiment, the first value is zero and the second value is one.

The WUR bit 208 is set to a first value to signal a WUR request and is set to a second value otherwise. In an embodiment, the first value is one and the second value is zero. In another embodiment, the first value is zero and the second value is one.

At least in some embodiments, the LPS bit 204 and the WUR bit 208 may be considered as a single multi-bit field in which i) a first value signals an LPS request, ii) a second value signals a WUR request, iii) a third value indicates that neither an LPS request nor a WUR request is being signaled, and iv) and a fourth value is not permitted.

Although in the example OAM frame 200 of FIG. 2, a single bit is used to signal a WUR request and another single bit is used to signal an LPS request, in other embodiments multiple bits are used to signal one or both of a WUR request and an LPS request. For example, in another embodiment, Symbol 0 includes i) a WUR field comprising two of bits D4-D7 and ii) a LPS field comprising another two of bits D4-D7. In some such embodiments, a first value of the WUR field signals a WUR request and the WUR field is otherwise set to other values; and a first value of the LPS field signals an LPS request and the LPS field is otherwise set to other values.

Although various embodiments were described above in which some or all of bits D4-D7 of Symbol 0 are used to signal WUR requests and LPS requests, in other embodiments, other bits of Symbol 0 additionally or alternative are used to signal WUR requests and LPS requests. For example, some or all of the other fields of Symbol 0 (corresponding to bits D0-D3) are moved (e.g., to one or more of bits D4-D7) or omitted from the OAM frame 200, in some other embodiments.

Although various embodiments were described above in which bits of Symbol 0 are used to signal WUR requests and LPS requests, in other embodiments, bits of Symbol 1 additionally or alternative are used to signal WUR requests and LPS requests. For example, one to four bits of Symbol 1 are moved (e.g., to one or more of bits D4-D7) or omitted from the OAM frame 200, and such moved/omitted bits are used to signal WUR requests and LPS requests using techniques such as described above, according to some other embodiments.

Thus, more generally, bits outside of (or distinct from) the OAM message content of an OAM frame are used to signal WUR requests and LPS requests. In some embodiments, bits of Symbol 0 and/or Symbol 1 are used to signal WUR requests and LPS requests, whereas Symbol 2 through Symbol 9 include OAM message content and Symbol 10 and Symbol 11 include CRC content.

In an embodiment, Symbol 0 and Symbol 1 correspond to an OAM frame header 212. As used herein, the term "OAM frame header" refers to information in an OAM frame that is outside of (or distinct from) OAM message content and that is transmitted prior to the OAM message content. Thus, in some embodiments, bits in the OAM frame header are used to signal WUR requests and LPS requests.

Similar to the OAM frame 1 of FIG. 1, the symbols of the OAM frame 200 are transmitted in order corresponding to the symbol numbers illustrated in FIG. 2 (a first order in time), i.e., Symbol 0 is transmitted first in time, then Symbol 1, etc., and Symbol 11 is transmitted last in time, according to an embodiment. The bits of each symbol of the OAM frame 200 are transmitted in order corresponding to the bit numbers (D0, D1, etc.) illustrated in FIG. 2 (a second order in time), i.e., D0 is transmitted first in time, then D1, etc., and D8 is transmitted last in time, according to an embodiment. Thus, bit D4 is transmitted fifth (in time) and bit D5 is transmitted sixth (in time) among the bits D0-D8 of Symbol 0. In another embodiment, the bits of Symbol 0 are scrambled according to a predetermined scrambling scheme prior to transmission, and thus bits D0-D8 are transmitted in an order in time that is different than the bit order illustrated in FIG. 2. In other embodiments, at least some of the bits D0-D8 are transmitted in parallel using e.g., multiple lanes (e.g., multiple wired links) and/or using frequency shift keying (FSK) modulation, amplitude-shift keying (ASK) modulation, phase-shift keying (PSK) modulation, amplitude and phase-shift keying (APSK) modulation, orthogonal frequency division multiplexing (OFDM) modulation, etc.

Figure 3:
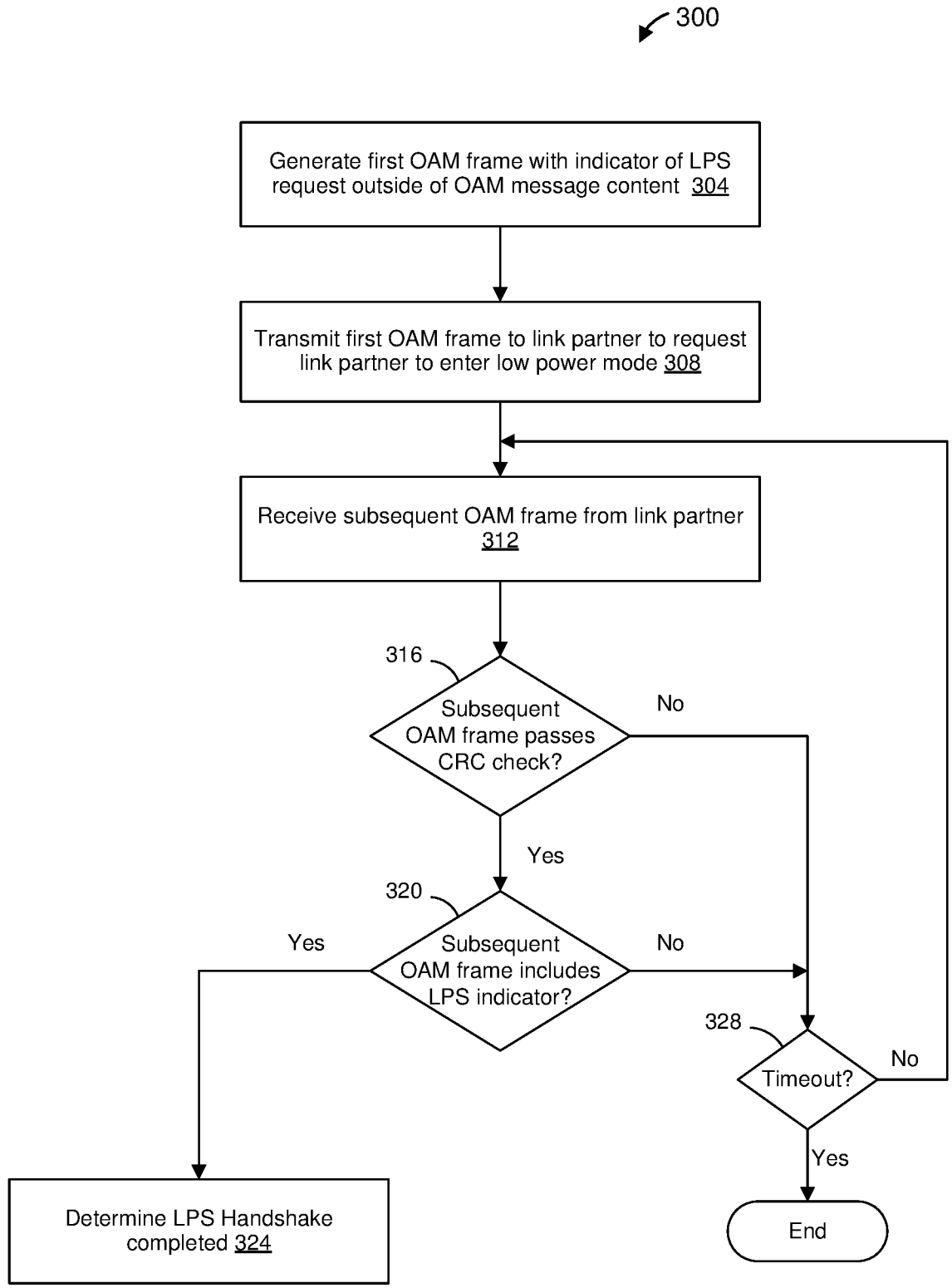
FIG. 3 is a simplified flow diagram of an example method for a first communication device to signal to a second communication device a request for the second communication device to transition to a low power mode, according to an embodiment.

FIG. 3 is a simplified flow diagram of an example method 300 for a first communication device to signal an LPS request to a second communication device (a link partner), according to an embodiment. In an embodiment, the LPS request corresponds to a request for the second communication device to transition to a low power mode. In another embodiment, the second communication device is a switch that propagates the LPS request to one or more third communication devices, and the LPS request corresponds to a request for the one or more third communication devices to transition to the low power mode.

The method 300 is utilized in connection with an OAM frame that includes i) OAM message content, and ii) other information outside of (or distinct from) the OAM message content, such as header information, trailer information, etc., according to some embodiments. For example, the method 300 is utilized in connection with an OAM frame having a structure as described above with reference to FIG. 2, in some embodiments, and is described with reference to FIG. 2 for explanatory purposes. In other embodiments, the method 300 is utilized in connection with an OAM frame having another suitable format.

At block 304, the first communication device generates a first OAM frame having i) OAM message content, and ii) an LPS request indicator located within the OAM frame and outside of the OAM message content. In an embodiment, generating the first OAM frame at block 304 comprises generating an OAM frame having a format as illustrated in FIG. 2, with the LPS bit 204 set to indicate an LPS request. In an embodiment, generating the first OAM frame at block 304 comprises generating an OAM frame having an LPS field within Symbol 0 set to indicate an LPS request.

At block 308, the first communication device transmits, via a communication link, the first OAM frame generated at block 304 to the link partner, according to an embodiment.

Some embodiments of the method 300 involve a handshake procedure in which the intended recipient of the LPS request, in response to receiving the LPS request within the first OAM frame, transmits a subsequent OAM frame to the first communication device when the intended recipient decides to transition to the low power mode. Thus, at block 312, the first communication device receives, via the communication link, a subsequent OAM frame that was transmitted by the link partner (or the intended recipient of the first OAM frame). In an embodiment, the subsequent OAM frame has a same general format as the first OAM frame generated at block 304. In some embodiments, the subsequent OAM frame has a structure as described above with reference to FIG. 2.

At block 316, the first communication device determines whether the subsequent OAM frame includes one or more bit errors using CRC information in the subsequent OAM frame. In embodiments in which the subsequent OAM frame has a structure as described above with reference to FIG. 2, the first communication device generates a CRC result using Symbol 0 through Symbol 9, and then compares the CRC result to a CRC value included in Symbol 10 and Symbol 11. If the first communication device determines that the CRC result equals the CRC value included in Symbol 10 and Symbol 11, the flow proceeds to block 320.

At block 320, the first communication device determines whether the subsequent OAM frame includes an LPS request indicator. The subsequent OAM frame includes OAM message content, and block 320 includes determining whether the subsequent OAM frame includes an LPS request indicator located within the subsequent OAM frame and outside of the OAM message content. In an embodiment, determining whether the subsequent OAM frame includes the LPS request indicator at block 320 comprises determining whether the LPS bit 204 is set to indicate an LPS request. In an embodiment, determining whether the subsequent OAM frame includes the LPS request indicator at block 320 comprises determining whether the subsequent OAM frame includes an LPS field within Symbol 0 set to indicate an LPS request.

If the first communication device determines that the subsequent OAM frame includes the LPS request indicator, the flow proceeds to block 324. At block 324, the first communication device determines that an LPS handshake was completed. Completion of the LPS handshake helps the first communication device to confirm that the intended recipient will transition to the low power mode in response to the first OAM frame, according to some embodiments.

Referring again to block 316, if the first communication device determines that the CRC result does not equal the CRC value included in Symbol 10 and Symbol 11, the flow proceeds to block 328. At block 328, the first communication device determines whether a timeout period has elapsed. For example, the first communication device starts a timer in connection with transmitting the first OAM frame at block 308, and determines whether the timer expired at block 328.

In response to determining that the timeout period has not elapsed, the flow returns to block 312 to receive a next OAM frame. For example, in some embodiments, the second communication device transmits one or more other OAM frames before transmitting an OAM frame with an LPS indicator. Thus, the first communication device may evaluate one or more other OAM frames from the second communication device at blocks 316 and 320 prior to detecting an OAM frame that includes an LPS indicator.

Referring again to block 320, if the first communication device determines that the subsequent OAM frame does not include an LPS request indicator, the flow proceeds to block 328, at which the first communication device determines whether the timeout period elapsed, as discussed above.

In some embodiments that use an OAM frame structure in which an LPS request field is included in Symbol 0 and Symbol 0 also includes a parity bit, the method 300 further comprises checking the parity bit of Symbol 0 of the subsequent OAM frame to determine if Symbol 0 includes a bit error. In response to determining, using the parity bit, that Symbol 0 includes a bit error, the flow of the method 300 proceeds to block 328. On the other hand, in response to determining, using the parity bit, that Symbol 0 does not include a bit error, further processing of the subsequent OAM frame proceeds.

In some other embodiments, the method 300 does not utilize a handshake procedure such as described above and omits blocks 312, 316, 320, 324, and 328.

In other embodiments, other suitable modifications to the flow illustrated in FIG. 3 are made, such as omitting one or more blocks, adding additional blocks, etc. As an example, block 316 is omitted in some embodiments. As another example, one or more additional blocks corresponding to additional processing of the subsequent OAM frame are included in other embodiments.

Figure 4:
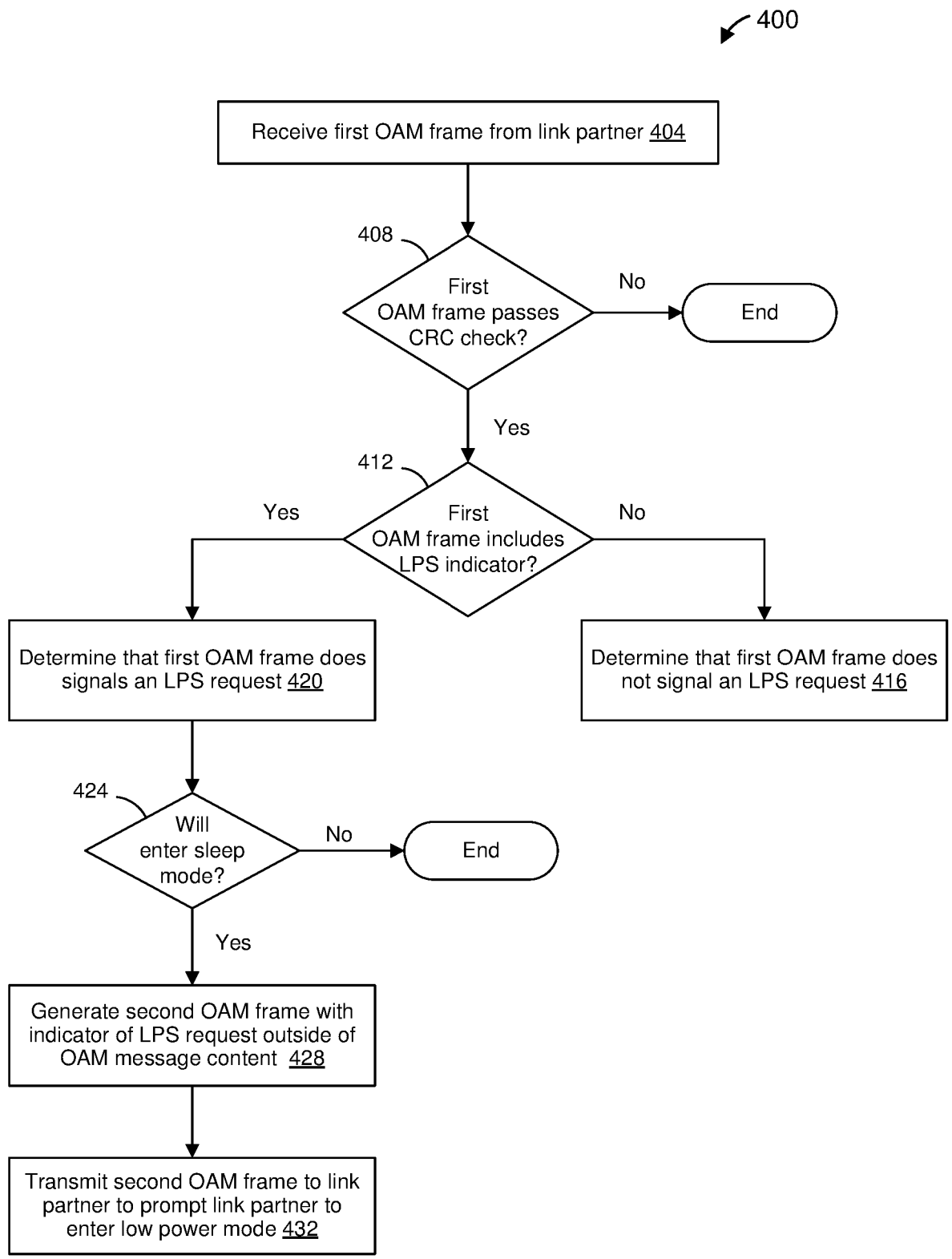
FIG. 4 is a simplified flow diagram of an example method for a first communication device to determine whether an OAM frame from a second communication device (a link partner) includes a request for the first communication device to transition to a low power mode, according to an embodiment.

FIG. 4 is a simplified flow diagram of an example method 400 for a first communication device to determine whether an OAM frame from a second communication device (a link partner) includes a request for the first communication device to transition to a low power mode, according to an embodiment. The method 400 is utilized in connection with an OAM frame that includes i) OAM message content, and ii) other information outside of (or distinct from) the OAM message content, such as header information, trailer information, etc., according to some embodiments. For example, the method 400 is utilized in connection with an OAM frame having a structure as described above with reference to FIG. 2, in some embodiments, and is described with reference to FIG. 2 for explanatory purposes. In other embodiments, the method 400 is utilized in connection with an OAM frame having another suitable format.

At block 404, the first communication device receives, via a communication link, a first OAM frame that was transmitted by the link partner. In an embodiment, the first OAM frame received at block 404 has a structure as described above with reference to FIG. 2. In other embodiments, the first OAM frame has another suitable structure.

At block 408, the first communication device determines whether the first OAM frame includes one or more bit errors using CRC information in the first OAM frame. In embodiments in which the first OAM frame has a structure as described above with reference to FIG. 2, the first communication device generates a CRC result using Symbol 0 through Symbol 9, and then compares the CRC result to a CRC value included in Symbol 10 and Symbol 11. If the first communication device determines that the CRC result does not equal the CRC value included in Symbol 10 and Symbol 11, the flow ends. On the other hand, if the first communication device determines that the CRC result equals the CRC value included in Symbol 10 and Symbol 11, the flow proceeds to block 412.

At block 412, the first communication device determines whether the first OAM frame includes an LPS request indicator. As discussed above, the first OAM frame includes OAM message content, and block 412 includes determining whether the first OAM frame includes an LPS request indicator located within the first OAM frame and outside of the OAM message content. In an embodiment, determining whether the first OAM frame includes the LPS request indicator at block 412 comprises determining whether the LPS bit 204 is set to indicate an LPS request. In an embodiment, determining whether the first OAM frame includes the LPS request indicator at block 412 comprises determining whether the first OAM frame includes an LPS field within Symbol 0 set to indicate an LPS request.

If the first communication device determines at block 412 that the first OAM frame does not include the LPS request indicator, the flow proceeds to block 416. At block 416, the first communication device determines that the first OAM frame does not signal an LPS request. When the first OAM frame does not signal an LPS request, the first communication device may further process the first OAM frame for purposes unrelated to LPS requests, according to an embodiment.

On the other hand, if the first communication device determines at block 412 that the first OAM frame includes the LPS request indicator, the first communication device determines that the first OAM frame includes an LPS request at block 420.

At block 424, the first communication device determines whether the first communication device will transition to the low power mode in response to the LPS request in the first OAM frame. In response to the first communication device determining at block 424 that the first communication device will not transition to the low power mode in response to the LPS request in the first OAM frame, the flow ends.

On the other hand, in response to the first communication device determining at block 424 that the first communication device will transition to the low power mode in response to the LPS request in the first OAM frame, the flow proceeds to block 428. At block 428, the first communication device generates a second OAM frame having i) OAM message content, and ii) an LPS request indicator located within the OAM frame and outside of the OAM message content. In an embodiment, generating the second OAM frame at block 428 comprises generating an OAM frame having a format as illustrated in FIG. 2, with the LPS bit 204 set to indicate an LPS request. In an embodiment, generating the second OAM frame at block 428 comprises generating an OAM frame having an LPS field within Symbol 0 set to indicate an LPS request.

At block 432, the first communication device transmits, via the communication link, the second OAM frame generated at block 428 to the link partner to signal that the first communication device will transition to the low power mode. Transmitting the second OAM frame at block 432 corresponds to a handshake procedure, such as described with reference to FIG. 3, in which the first communication device, in response to receiving the LPS request within the first OAM frame and in response to determining that the first communication device will transition to the low power mode, transmits the second OAM frame to the link partner to signal that the first communication device will transition to the low power mode in response to receiving the first OAM frame.

In some embodiments, the first communication device transmits one or more other OAM frames between receiving the first OAM frame and transmitting the second OAM frame.

In some embodiments that use an OAM frame structure in which an LPS request field is included in Symbol 0 and Symbol 0 also includes a parity bit, the method 400 further comprises checking the parity bit of Symbol 0 of the first OAM frame to determine if Symbol 0 includes a bit error. In response to determining, using the parity bit, that Symbol 0 includes a bit error, the flow of the method 400 ends. On the other hand, in response to determining, using the parity bit, that Symbol 0 of the first OAM frame does not include a bit error, further processing of the first OAM frame proceeds.

In some other embodiments, the method 400 does not utilize a handshake procedure such as described above and omits blocks 428 and 432.

In other embodiments, other suitable modifications to the flow illustrated in FIG. 4 are made, such as omitting one or more blocks, adding additional blocks, etc. As just one example, block 408 is omitted in another embodiment. As another example, one or more blocks corresponding to additional processing of the first OAM frame are added in some embodiments. As yet another example, the method 400 further comprises transitioning at least some circuitry of the first communication device to the low power mode in response to (at least partially) determining at block 424 that the first communication device will enter the low power mode, according to another embodiment.

Figure 5:
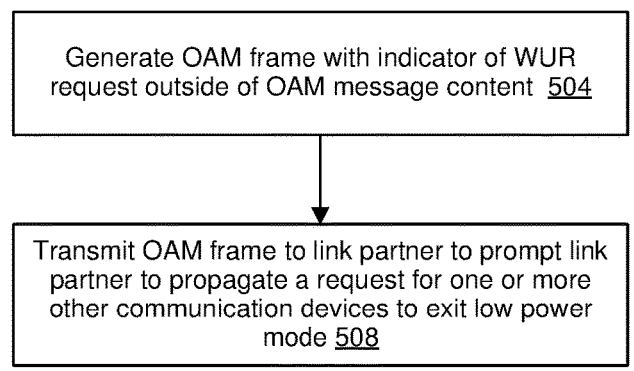
FIG. 5 is a simplified flow diagram of an example method for a first communication device to signal to a second communication device (a link partner) a request for the second communication device to wake up from a low power mode, according to an embodiment.

FIG. 5 is a simplified flow diagram of an example method 500 for a first communication device to prompt a second communication device (a link partner) to propagate a request for one or more third communication devices to wake up from a low power mode, according to an embodiment. The method 500 is utilized in connection with an OAM frame that includes i) OAM message content, and ii) other information outside of the OAM message content, such as header information, trailer information, etc., according to some embodiments. For example, the method 500 is utilized in connection with an OAM frame having a structure as described above with reference to FIG. 2, in some embodiments, and is described with reference to FIG. 2 for explanatory purposes. In other embodiments, the method 500 is utilized in connection with an OAM frame having another suitable format.

At block 504, the first communication device generates an OAM frame having i) OAM message content, and ii) a WUR request indicator located within the OAM frame and outside of the OAM message content. In an embodiment, generating the OAM frame at block 504 comprises generating an OAM frame having a format as illustrated in FIG. 2, with the WUR bit 208 set to indicate a WUR request. In an embodiment, generating the OAM frame at block 504 comprises generating an OAM frame having a WUR field within Symbol 0 set to indicate a WUR request.

At block 508, the first communication device transmits, via a communication link, the OAM frame generated at block 504 to the link partner to prompt the link partner to propagate a request for one or more third communication devices to wake up from a low power mode of operation, according to an embodiment.

Figure 6:
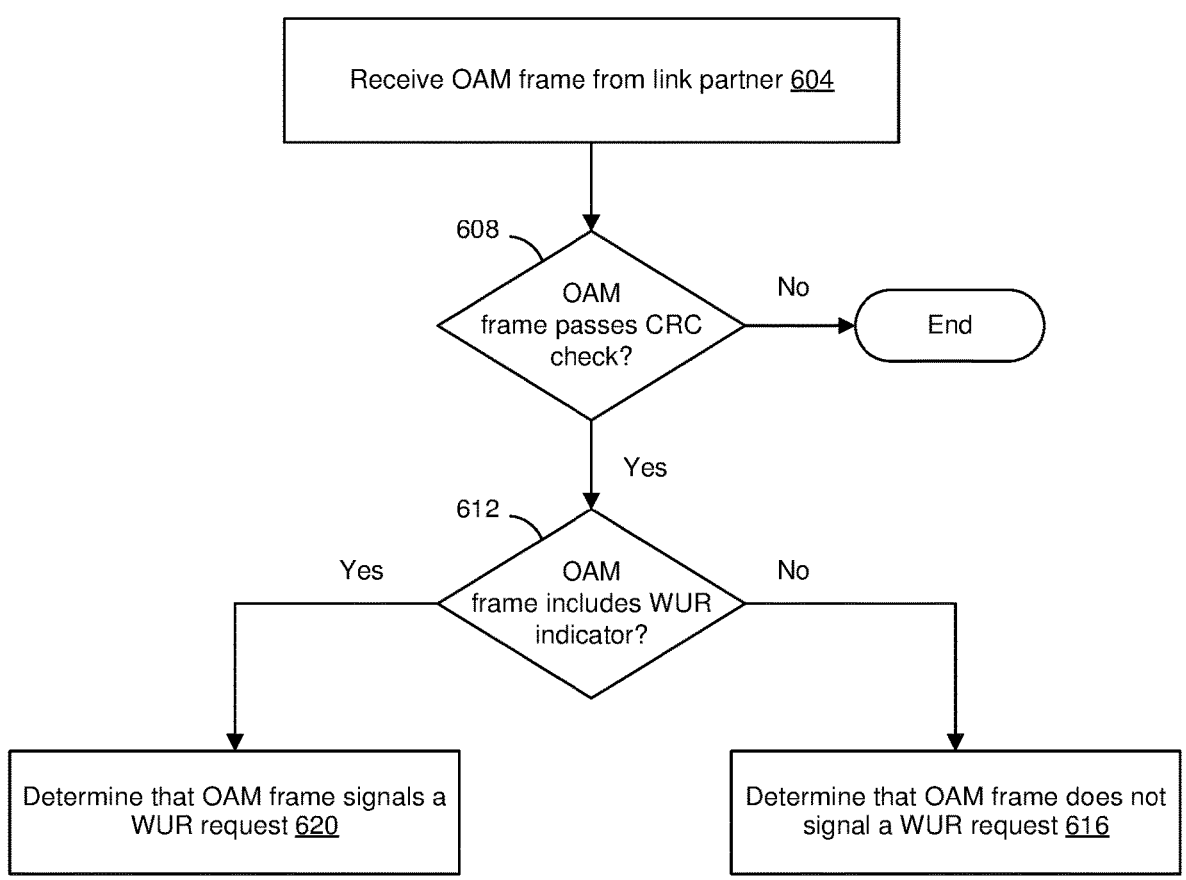
FIG. 6 is a simplified flow diagram of an example method for a first communication device to determine whether an OAM frame from a second communication device (a link partner) includes a request for the first communication device to wake up from a low power mode, according to an embodiment.

FIG. 6 is a simplified flow diagram of an example method 600 for a first communication device to determine whether an OAM frame from a second communication device (a link partner) includes a request for the first communication device to propagate a request for one or more third communication devices to wake up from a low power mode, according to an embodiment. The method 600 is utilized in connection with an OAM frame that includes i) OAM message content, and ii) other information outside of the OAM message content, such as header information, trailer information, etc., according to some embodiments. For example, the method 600 is utilized in connection with an OAM frame having a structure as described above with reference to FIG. 2, in some embodiments, and is described with reference to FIG. 2 for explanatory purposes. In other embodiments, the method 600 is utilized in connection with an OAM frame having another suitable format.

At block 604, the first communication device receives, via a communication link, an OAM frame that was transmitted by the link partner. In an embodiment, the OAM frame received at block 604 has a structure as described above with reference to FIG. 2. In other embodiments, the OAM frame has another suitable structure.

At block 608, the first communication device determines whether the OAM frame includes one or more bit errors using CRC information in the OAM frame. In embodiments in which the OAM frame has a structure as described above with reference to FIG. 2, the first communication device generates a CRC result using Symbol 0 through Symbol 9, and then compares the CRC result to a CRC value included in Symbol 10 and Symbol 11. If the first communication device determines that the CRC result does not equal the CRC value included in Symbol 10 and Symbol 11, the flow ends. On the other hand, if the first communication device determines that the CRC result equals the CRC value included in Symbol 10 and Symbol 11, the flow proceeds to block 612.

At block 612, the first communication device determines whether the OAM frame includes a WUR request indicator. As discussed above, the OAM frame includes OAM message content, and block 612 includes determining whether the OAM frame includes a WUR request indicator located within the OAM frame and outside of the OAM message content. In an embodiment, determining whether the OAM frame includes the WUR request indicator at block 612 comprises determining whether the WUR bit 208 is set to indicate a WUR request. In an embodiment, determining whether the OAM frame includes the WUR request indicator at block 612 comprises determining whether the OAM frame includes a WUR field within Symbol 0 set to indicate a WUR request.

If the first communication device determines at block 612 that the OAM frame does not include the WUR request indicator, the flow proceeds to block 616. At block 616, the first communication device determines that the OAM frame does not signal a WUR request. On the other hand, if the first communication device determines at block 612 that the OAM frame includes the WUR request indicator, the flow proceeds to block 620. At block 620, the first communication device determines that the OAM frame includes a WUR request.

In some embodiments that use an OAM frame structure in which a WUR request field is included in Symbol 0 and Symbol 0 also includes a parity bit, the method 600 further comprises checking the parity bit of Symbol 0 of the OAM frame to determine if Symbol 0 includes a bit error. In response to determining, using the parity bit, that Symbol 0 includes a bit error, the flow of the method 600 ends. On the other hand, in response to determining, using the parity bit, that Symbol 0 of the OAM frame does not include a bit error, further processing of the OAM frame proceeds.

In other embodiments, other suitable modifications to the flow illustrated in FIG. 6 are made, such as omitting one or more blocks, adding additional blocks, etc. As just one example, block 608 is omitted in another embodiment. As another example, one or more blocks corresponding to additional processing of the OAM frame are added in some embodiments. As yet another example, the method 600 further comprises propagating a request for one or more third communication devices to transition to an active mode in response to (at least partially) determining at block 620 that the OAM frame signals a WUR request, according to another embodiment.

Figure 7:
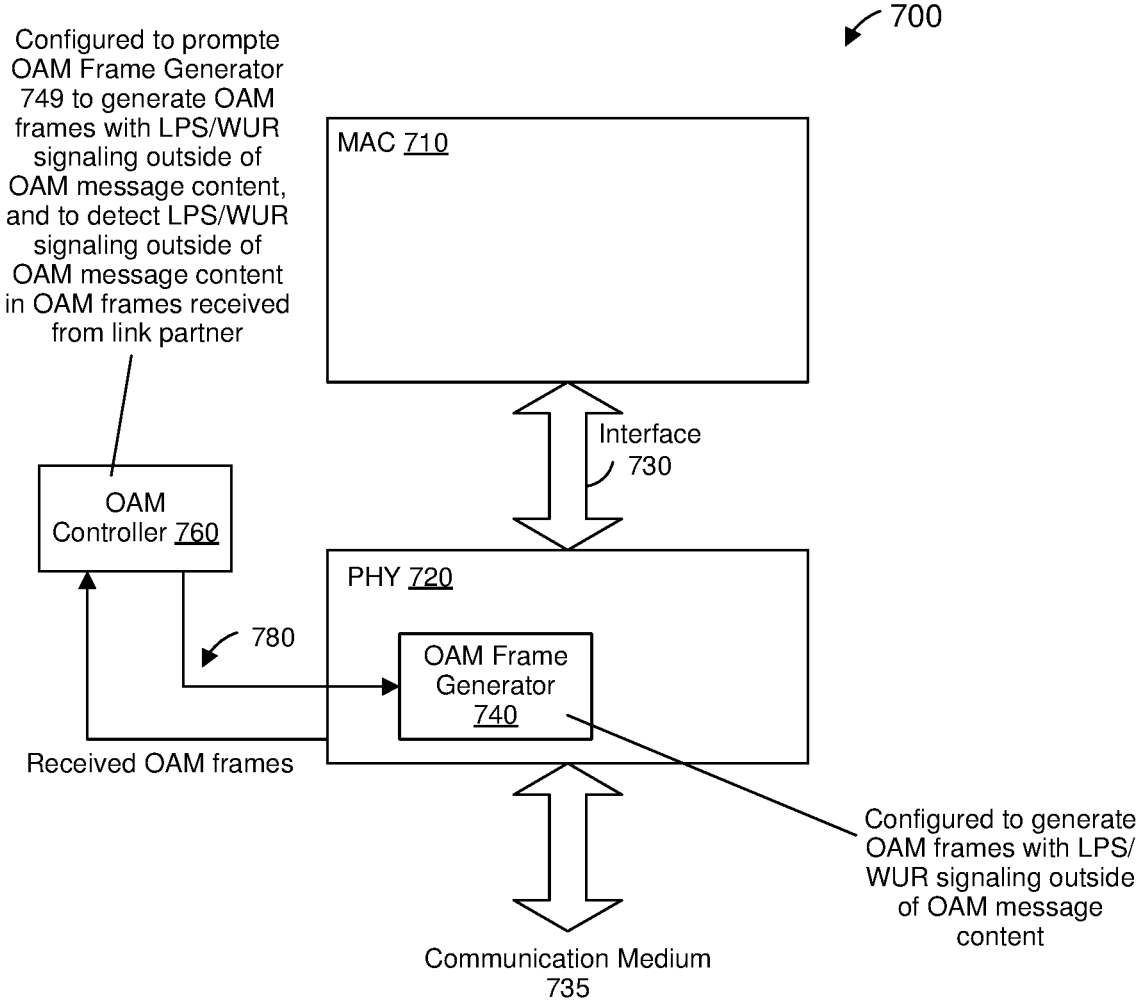
FIG. 7 is a simplified block diagram of an example communication device that is configured to generate and transmit OAM frames having the format illustrated in FIG. 2, and to receive and process OAM frames having the format illustrated in FIG. 2, according to an embodiment.

FIG. 7 is a block diagram of an example communication device 700 that is configured to generate and transmit OAM frames such as described above, and to receive and process OAM frames such as described above, according to an embodiment. The communication device 700 includes at least a media access control (MAC) processing device 710 and a physical layer (PHY) processing device 720. In some embodiments, the MAC processing device 710 and the PHY processing device 720 are compliant with the IEEE 802.3 Ethernet Standard, except as otherwise disclosed below. In other embodiments, the MAC processing device 710 and the PHY processing device 720 are compliant with another suitable communication protocol.

The MAC processing device 710 is configured to perform MAC layer functions associated with a communication protocol such as the communication protocol defined by the IEEE 802.3 Ethernet Standard or another suitable communication protocol. Similarly, the PHY processing device 720 is configured to perform PHY functions associated with a communication protocol such as the communication protocol defined by the IEEE 802.3 Ethernet Standard (except as otherwise disclosed below) or another suitable communication protocol.

In an embodiment the MAC processing device 710 comprises a processor (not shown) and a memory (not shown) coupled to the processor, where the processor is configured to execute machine readable instructions stored in the memory. In an embodiment, the memory stores machine readable instructions that, when executed by the processor, cause the processor to perform MAC layer functions associated with a communication protocol such as the communication protocol defined by the IEEE 802.3 Ethernet Standard or another suitable communication protocol.

In another embodiment the MAC processing device 710 additionally or alternatively comprises a hardware state machine (not shown) configured to perform MAC layer functions associated with a communication protocol such as the communication protocol defined by the IEEE 802.3 Ethernet Standard or another suitable communication protocol.

The MAC processing device 710 is communicatively coupled to the PHY processing device 720 via a communication interface 730 such as a 10 Gigabit Media Independent Interface (XGMII). In other embodiments, the MAC processing device 710 is communicatively coupled to the PHY processing device 720 via another suitable communication interface such as another suitable media independent interface (e.g., the reduced media-independent interface (RMII), the Gigabit Media Independent Interface (GMII), the reduced gigabit media-independent interface (RGMII), the serial gigabit media-independent interface (SGMII), the high serial gigabit media-independent interface (HSGMII), the quad serial gigabit media-independent interface (QSGMII), etc.), according to some embodiments.

In an embodiment, the MAC processing device 710 provides, via the interface 730, data to the PHY processing device 720 for transmission via a suitable communication medium 735 such as a wired, optical, or wireless communication medium. In an illustrative embodiment, the communication medium 735 comprises a single twisted pair. In another illustrative embodiment, the communication medium 735 comprises multiple twisted pairs. In various embodiments, the communication medium 735 is configured for communication at one or more suitable bit rates such as one or more of 100 Megabits per second (Mbps), 1 Gigabit per second (Gbps), 2.5 Gbps, 5 Gbps, 10 Gbps, 25 Gbps, 100 Gbps, etc.

In response to receiving the data from the MAC processing device 710, the PHY processing device 720 encodes, scrambles, and modulates the data to generate a transmission signal for transmitting the data via the communication medium 735.

In an embodiment, the PHY processing device 720 also receives a receive signal via the communication medium, and demodulates, de-scrambles, and decodes data in the receive signal to generate received data. Additionally, the PHY processing device 720 provides at least some of the received data to the MAC processing device 710 via the interface 730.

The PHY processing device 720 includes one or more encoder devices (not shown), a scrambler device (not shown), and a modulator (not shown) for encoding, scrambling, and modulating data as part of generating a transmission signal, according to an embodiment. The PHY processing device 720 also includes a demodulator (not shown), a de-scrambler device (not shown), and one or more decoder devices (not shown) for demodulating, de-scrambling, and decoding as part of generating the received data, according to an embodiment. In some embodiments, the PHY processing device 720 also includes an analog to digital converter (hereinafter "ADC", not shown) that converts an analog signal received via the communication medium to a digital signal. In some embodiments, the PHY processing device 720 also includes a digital signal processor (hereinafter "DSP", not shown) that processes the digital signal to generate a signal corresponding to modulation symbols that are then demodulated by the demodulator (not shown).

In an embodiment, the PHY processing device 720 comprises a hardware state machine (not shown) in which at least some states of the hardware state machine generally correspond to at least some of the various operating states and/or modes of the PHY processing device 720. The hardware state machine is configured to generate control signals that control operation of the PHY processing device 720 according to various operating states and/or modes, and to transition between states of the hardware state machine in response to receiving signals and/or information.

In another embodiment, the PHY processing device 720 comprises a processor that executes machine readable instructions that causes the processor to implement a state machine similar to the hardware state machine described above.

In an embodiment, communication device 700 is configured to operate according to a suitable communication protocol such as a communication protocol defined by the IEEE 802.3bp Standard, a communication protocol defined by the IEEE 802.3bw Standard, a communication protocol defined by the IEEE 802.3ch Standard, a communication protocol defined by the IEEE 802.3ck Standard (now under development), a communication protocol defined by the IEEE 802.3cy Standard (now under development), a communication protocol defined by the IEEE 802.3cz Standard (now under development), etc.

The PHY processing device 720 comprises an OAM frame generator 740. The OAM frame generator 740 is configured to generate OAM frames such as described above for transmission to a link partner via the communication medium.

The communication device 700 also includes an OAM controller 760 communicatively coupled to the PHY processing device 720 via an interface 780 (e.g., a serial management interface (SMI) or another suitable interface) that is separate from the interface 730, according to an embodiment. The OAM controller 760 is configured to prompt the OAM frame generator 740 to generate OAM frames such as described above for transmission to a link partner via the communication medium; and the OAM controller 760 is also configured to process OAM frames such as described above that are received from the PHY processing device 720, the received OAM frames having been transmitted by the link partner via the communication medium 735. For instance, in various embodiments, the OAM controller 760 is configured to prompt the OAM frame generator 740 to generate an OAM frame having the format illustrated in FIG. 2 for transmission to a link partner, and to process an OAM frame having the format illustrated in FIG. 2 when the OAM frame is received from the link partner.

In various embodiments, the communication device 700 is configured to perform one of, or any suitable combination of two or more of, the methods discussed above with reference to FIGS. 3-6. In various embodiments, the OAM controller 760 is configured to perform (alone or in conjunction with the OAM frame generator 740, the PHY processing device 720, the MAC processing device 710, and/or the interface 780) the methods discussed above with reference to FIGS. 3-6.

In other embodiments, the OAM controller 760 is included in the PHY processing device 720 and the interface 780 is omitted. In other embodiments, the OAM frame generator 740 is external to the PHY processing device 720, and OAM frames generated by the OAM frame generator 740 are provided to the PHY processing device 720 via the interface 780. In other embodiments, the OAM controller 760 is included in the MAC processing device 710 and the interface 780 is omitted; for example, the OAM controller 760 is configured to signal the OAM frame generator 740, via the interface 730, to generate OAM frames such as described above, and the OAM controller 760 is also configured to receive OAM frames such as described above from the PHY processing device 720 via the interface 730.

In another embodiment, the PHY processing device 720 includes a LPS/WUR detector (not shown) that is configured to i) determine whether an OAM frame received via the communication medium 735 includes an LPS signal or a WUR signal, and ii) signal to the OAM controller 760, via the interface 780, whether the OAM frame includes an LPS signal or a WUR signal.

FIG. 8 is a diagram of another example OAM frame 800 that is useable to signal an LPS request and to signal a WUR request, according to some embodiments. The OAM frame 800 is similar to an OAM frame defined by the IEEE 802.3ch Standard. In various embodiments, the OAM frame 800 is used in conjunction with the method 300 of FIG. 3, the method 400 of FIG. 4, the method 500 of FIG. 5, the method 600 of FIG. 6, and/or the communication device 700 of FIG. 7.

The OAM frame 800 is similar to the OAM frame 100 of FIG. 1 and to the OAM frame 200 of FIG. 2, and some fields and bits similar to the OAM frame 100 of FIG. 1 and/or the OAM frame 200 of FIG. 2 are not described in detail for purposes of brevity.

The OAM frame 800 consists of 16 symbols (Symbol 0 through Symbol 15), each symbol consisting of ten data bits, D9 through D0. In Symbol 0 through Symbol 13, the data bit D8 is set to values as indicated in FIG. 8, and data bit D9 is reserved.

Symbol 2 through Symbol 13 include the OAM message (within data bits D7 through D0). OAM messages are user-defined and not specified by the IEEE 802.3ch Standard.

Symbol 14 and Symbol 15 include Reed-Solomon parity information generated according to a Reed-Solomon error correcting code using at least the 12 bytes included in Symbol 2 through Symbol 13.

As illustrated in FIG. 8, bits D9 through D0 are arranged in an order corresponding to the bit numbers D9 through D0, i.e., D0 is a first bit in the bit order, D1 is a second bit in the bit order, etc., and D9 is a tenth bit in the bit order, according to an embodiment. The first bit (i.e., D0) is adjacent to the second bit (i.e., D1); the second bit is also adjacent to the third bit (i.e., D2) and is between the first bit and the third bit; the third bit is also adjacent to the fourth bit (i.e., D3) and is between the second bit and the fourth bit; etc. Thus, bit D4 is fifth in the bit order and bit D5 is sixth in the bit order, according to an embodiment, with bit D4 adjacent to and between bits D3 and D5, and with bit D5 adjacent to and between bits D4 and D6.

Symbol 0 includes i) an LPS bit 804 at location D4, and ii) a WUR bit 808 at location D5, i.e., the LPS bit 804 is fifth in the bit order and the WUR bit 808 is sixth in the bit order. In another embodiment, the LPS bit 804 is located at bit D5 and the WUR bit 808 is located at bit D4, i.e., the WUR bit 808 is fifth in the bit order and the LPS bit 804 is sixth in the bit order. In various other embodiments, the LPS bit 804 is one of bits D4-D7, and the WUR bit 808 is another one of the bits D4-D7, i.e., the LPS bit 804 is one of fifth through eighth in the bit order and the WUR bit 808 is another one of fifth through eighth in the bit order.

The LPS bit 804 is set to a first value to signal an LPS request and is set to a second value otherwise. In an embodiment, the first value is one and the second value is zero. In another embodiment, the first value is zero and the second value is one.

The WUR bit 808 is set to a first value to signal a WUR request and is set to a second value otherwise. In an embodiment, the first value is one and the second value is zero. In another embodiment, the first value is zero and the second value is one.

At least in some embodiments, the LPS bit 804 and the WUR bit 808 may be considered as a single multi-bit field in which i) a first value signals an LPS request, ii) a second value signals a WUR request, iii) a third value indicates that neither an LPS request nor a WUR request is being signaled, and iv) and a fourth value is not permitted.

Although in the example OAM frame 800 of FIG. 8, a single bit is used to signal a WUR request and another single bit is used to signal an LPS request, in other embodiments multiple bits are used to signal one or both of a WUR request and an LPS request. For example, in another embodiment, Symbol 0 includes i) a WUR field comprising two of bits D4-D7 and ii) a LPS field comprising another two of bits D4-D7. In some such embodiments, a first value of the WUR field signals a WUR request and the WUR field is otherwise set to other values; and a first value of the LPS field signals an LPS request and the LPS field is otherwise set to other values.

Although various embodiments were described above in which some or all of bits D4-D7 of Symbol 0 are used to signal WUR requests and LPS requests, in other embodiments, other bits of Symbol 0 additionally or alternative are used to signal WUR requests and LPS requests. For example, some or all of the other fields of Symbol 0 (corresponding to bits D0-D3) are moved (e.g., to one or more of bits D4-D7) or omitted from the OAM frame 800, in some other embodiments.

Although various embodiments were described above in which bits of Symbol 0 are used to signal WUR requests and LPS requests, in other embodiments, bits of Symbol 1 additionally or alternative are used to signal WUR requests and LPS requests. For example, one to four bits of Symbol 1 are moved (e.g., to one or more of bits D4-D7) or omitted from the OAM frame 800, and such moved/omitted bits are used to signal WUR requests and LPS requests using techniques such as described above, according to some other embodiments.

Thus, more generally, bits outside of the OAM message content of an OAM frame are used to signal WUR requests and LPS requests. In some embodiments, bits of Symbol 0 and/or Symbol 1 are used to signal WUR requests and LPS requests, whereas Symbol 2 through Symbol 13 include OAM message content, and Symbol 14 and Symbol 15 include error correction code (e.g., Reed-Solomon code, or another suitable error correction code) parity content. In another embodiment, Symbol 14 and Symbol 15 include error detection code (e.g., CRC, or another suitable error detection code) parity content.

In an embodiment, Symbol 0 and Symbol 1 correspond to an OAM frame header 812. As used herein, the term "OAM frame header" refers to information in an OAM frame that is outside of OAM message content and that is transmitted prior to the OAM message content. Thus, in some embodiments, bits in the OAM frame header are used to signal WUR requests and LPS requests.

Similar to the OAM frame 1 of FIG. 1, the symbols of the OAM frame 800 are transmitted in order corresponding to the symbol numbers illustrated in FIG. 8 (a first order in time), i.e., Symbol 0 is transmitted first in time, then Symbol 1, etc., and Symbol 15 is transmitted last in time, according to an embodiment. The bits of each symbol of the OAM frame 800 are transmitted in order corresponding to the bit numbers (D0, D1, etc.) illustrated in FIG. 8 (a second order in time), i.e., D0 is transmitted first in time, then D1, etc., and D9 is transmitted last in time, according to an embodiment. Thus, bit D4 is transmitted fifth (in time) and bit D5 is transmitted sixth (in time) among the bits D0-D9 of Symbol 0. In another embodiment, the bits of Symbol 0 are scrambled according to a predetermined scrambling scheme prior to transmission, and thus bits D0-D9 are transmitted in an order in time that is different than the bit order illustrated in FIG. 8. In other embodiments, at least some of the bits D0-D9 are transmitted in parallel using e.g., multiple lanes (e.g., multiple wired links), and/or using FSK modulation, ASK modulation, PSK modulation, APSK modulation, OFDM modulation, etc.

Figure 9:
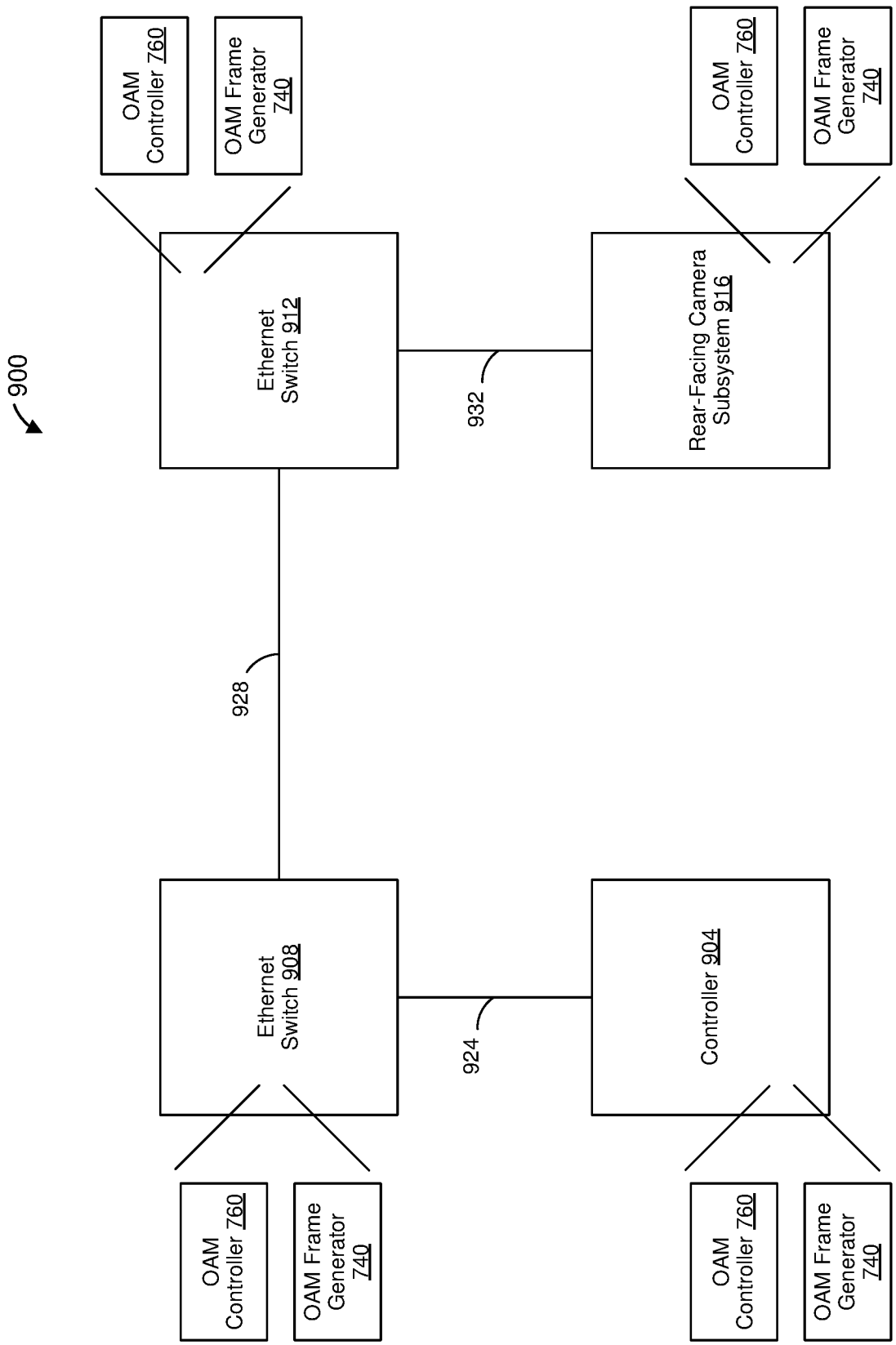
FIG. 9 is a simplified block diagram of an example motor vehicle communication network having communication devices that use the example OAM frame of FIG. 2 or the example OAM frame of FIG. 8 (or another suitable OAM frame) to signal LPS requests and to signal WUR requests, according to some embodiments.

FIG. 9 is a simplified block diagram of an example motor vehicle communication network 900, according to an embodiment. Various methods, apparatuses, and OAM frames discussed above are implemented in (and/or used in conjunction with) the motor vehicle communication network 900, according to various embodiments.

The motor vehicle communication network 900 includes a controller 904, an Ethernet switch 908, an Ethernet switch 912, and a rear-facing camera subsystem 916. The controller 904 is communicatively coupled to the Ethernet switch 908 via an Ethernet link 924. The Ethernet switch 908 is communicatively coupled to the Ethernet switch 912 via an Ethernet link 928. The rear-facing camera subsystem 916 is communicatively coupled to the Ethernet switch 912 via an Ethernet link 932.

The controller 904 comprises a processor (not shown) and a memory (not shown) communicatively coupled to the processor, where the processor executes machine readable instructions stored in the memory. The rear-facing camera subsystem 916 includes one or more cameras (not shown). The rear-facing camera subsystem 916 optionally includes a processor (not shown) and a memory (not shown) communicatively coupled to the processor, where the processor executes machine readable instructions stored in the memory.

Each of the controller 904, the Ethernet switch 908, the Ethernet switch 912, and the rear-facing camera subsystem 916 includes a respective OAM frame generator 740 and a respective OAM controller 760 discussed above with reference to FIG. 7, according to an embodiment. In another embodiment, each of the controller 904, the Ethernet switch 908, the Ethernet switch 912, and the rear-facing camera subsystem 916 additionally includes a respective LPS/WUR detector (not shown) discussed above with reference to FIG. 7. In another embodiment, each of the controller 904, the Ethernet switch 908, the Ethernet switch 912, and the rear-facing camera subsystem 916 additionally includes a respective communication device 700 discussed above with reference to FIG. 7.

As an illustrative example, the Ethernet switch 912 may prompt the rear-facing camera subsystem 916 to go into a low power mode by transmitting an OAM frame with an indicator of an LPS request (such as described above) to the rear-facing camera subsystem 916 via the Ethernet link 932. For instance, the Ethernet switch 912 may transmit the OAM frame with the indicator of the LPS request via the Ethernet link 932 in response to detecting a lack of activity on the Ethernet link 932 for a certain length of time. In response to receiving the OAM frame with the indicator of the LPS request via the Ethernet link 932, the rear-facing camera subsystem 916 may transition to a low power mode.

As another illustrative example in which the Ethernet switch 912 and the rear-facing camera subsystem 916 are already in the low power mode, the controller 904 may cause the Ethernet switch 912 and the rear-facing camera subsystem 916 to transition to an active mode by transmitting an OAM frame with an indicator of a WUR (such as described above) to the Ethernet switch 908 via the Ethernet link 924. For example, the controller 904 may determine that a gear selector has been put into a drive gear, a reverse gear, etc., and thus determine that devices in the automotive network 900 (e.g., the Ethernet switch 912 and the rear-facing camera subsystem 916) should transition to the active mode.

In response to receiving the OAM frame with the indicator of the WUR via the Ethernet link 924, the Ethernet switch 908 transmits a wake-up pulses (WUPs) via the Ethernet link 928 (i.e., the Ethernet switch 908 propagates the wake-up request from the controller 904) to prompt the Ethernet switch 912 to transition to the active mode. In response to receiving the WUPs via the Ethernet link 928, the Ethernet switch 912 transitions to the active mode and transmits WUPs via the Ethernet link 932 to prompt the rear-facing camera subsystem 916 to transition to the active mode. In response to receiving the WUPs via the Ethernet link 932, the rear-facing camera subsystem 916 transitions to the active mode.

Embodiment 1: A first communication device, comprising: a physical layer (PHY) processor comprising a transceiver, the PHY processor being configured to perform PHY functions associated with a communication link including transmitting first frames to a second communication device via a communication medium corresponding to the communication link and receiving second frames from the second communication device via the communication medium; and a controller configured to: generate an Operation, Administration, and Maintenance (OAM) frame that includes i) OAM message content and ii) an OAM frame header outside of the OAM message content, wherein generating the OAM frame comprises generating the OAM frame header to include information that signals one of i) a low power sleep (LPS) request, and ii) a wake-up request (WUR), and prompt the PHY processor to transmit the OAM frame to the second communication device via the communication medium to signal to the second communication device the one of i) the LPS request, and ii) the WUR.

Embodiment 2: The first communication device of embodiment 1, wherein: the controller is configured to generate the OAM frame to include a plurality of symbols; the PHY processor is configured to transmit the plurality of symbols in an order in time; and the controller is further configured to generate the OAM frame header to include the information that signals the one of i) the LPS request, and ii) the WUR within a first symbol, among the plurality of symbols, that is transmitted first in time among the plurality of symbols.

Embodiment 3: The first communication device of embodiment 2, wherein: the PHY processor is configured to transmit the plurality of symbols in a first order in time; and the controller is configured to generate the first symbol to include a plurality of bits; the PHY processor is configured to transmit the plurality of bits of the first symbol in a second order in time; and the controller is configured to one of i) set a value of a first bit, among the plurality of bits, that is transmitted fifth in time among the plurality of bits to signal the LPS request, and ii) set a value of a second bit, among the plurality of bits, that is transmitted sixth in time among the plurality of bits to signal the WUR.

Embodiment 4: The first communication device of embodiment 2, wherein: the PHY processor is configured to transmit the plurality of symbols in a first order in time; and the controller is configured to generate the first symbol to include a plurality of bits; the PHY processor is configured to transmit the plurality of bits of the first symbol in a second order in time; and the controller is configured to one of i) set a value of a first bit, among the plurality of bits, that is transmitted fifth in time among the plurality of bits to signal the WUR, and ii) set a value of a second bit, among the plurality of bits, that is transmitted sixth in time among the plurality of bits to signal the LPS request.

Embodiment 5: The first communication device of embodiment 2, wherein: the controller is configured to generate the first symbol to include a plurality of bits arranged according to a bit order, the plurality of bits including at least a first bit in the bit order, a second bit in the bit order that is adjacent to and between the first bit and a third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit; and the controller is configured to one of i) set a value of the fifth bit in the bit order to signal the LPS request, and ii) set a value of the sixth bit in the bit order to signal the WUR.

Embodiment 6: The first communication device of embodiment 2, wherein: the controller is configured to generate the first symbol to include a plurality of bits arranged according to a bit order, the plurality of bits including at least a first bit in the bit order, a second bit in the bit order that is adjacent to and between the first bit and a third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit; and the controller is configured to one of i) set a value of the fifth bit in the bit order to signal the WUR, and ii) set a value of the sixth bit in the bit order to signal the LPS request.

Embodiment 7: The first communication device of any of embodiments 1-6, wherein the controller comprises: a processor; and a memory coupled to the processor, the memory storing machine readable instructions that, when executed by the processor, cause the processor to: generate the OAM frame that includes i) the OAM message content and ii) the OAM frame header.

Embodiment 8: The first communication device of any of embodiments 1-6, wherein the controller comprises: hardware circuitry configured to generate the OAM frame that includes i) the OAM message content and ii) the OAM frame header.

Embodiment 9: A method for communicating in a communication network, the method comprising: generating, at a first communication device, an Operation, Administration, and Maintenance (OAM) frame that includes i) OAM message content and ii) an OAM frame header outside of the OAM message content, wherein generating the OAM frame comprises generating the OAM frame header to include information that signals one of i) a low power sleep (LPS) request, and ii) a wake-up request (WUR); and transmitting, by the first communication device, the OAM frame to a second communication device via a communication medium to signal to the second communication device the one of i) the LPS request, and ii) the WUR.

Embodiment 10: The method for communicating of embodiment 9, wherein: generating the OAM frame comprises generating the OAM frame to include a plurality of symbols; transmitting the OAM frame comprises transmitting the plurality of symbols in an order in time; and generating the OAM frame header to include the information that signals the one of i) the LPS request, and ii) the WUR within a first symbol, among the plurality of symbols, that is transmitted first in time among the plurality of symbols.

Embodiment 11: The method for communicating of embodiment 10, wherein: transmitting the OAM frame comprises transmitting the plurality of symbols in a first order in time; and generating the OAM frame header comprises generating the first symbol to include a plurality of bits; transmitting the OAM frame further comprises transmitting the plurality of bits of the first symbol in a second order in time; and generating the OAM frame header to include the information that signals the one of i) the LPS, and ii) the WUR within a first symbol comprises one of i)

setting a value of a first bit, among the plurality of bits, that is transmitted fifth in time among the plurality of bits to signal the LPS request, and ii) setting a value of a second bit, among the plurality of bits, that is transmitted sixth in time among the plurality of bits to signal the WUR.

Embodiment 12: The method for communicating of embodiment 10, wherein: transmitting the OAM frame comprises transmitting the plurality of symbols in a first order in time; and generating the OAM frame header comprises generating the first symbol to include a plurality of bits; transmitting the OAM frame further comprises transmitting the plurality of bits of the first symbol in a second order in time; and generating the OAM frame header to include the information that signals the one of i) the LPS, and ii) the WUR within a first symbol comprises one of i) setting a value of a first bit, among the plurality of bits, that is transmitted fifth in time among the plurality of bits to signal the WUR, and ii) setting a value of a second bit, among the plurality of bits, that is transmitted sixth in time among the plurality of bits to signal the LPS request.

Embodiment 13: The method for communicating of embodiment 10, wherein: generating the OAM frame header comprises generating the first symbol to include a plurality of bits arranged according to a bit order, the plurality of bits including at least a first bit in the bit order, a second bit in the bit order that is adjacent to and between the first bit and a third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit; and generating the OAM frame header to include the information that signals the one of i) the LPS, and ii) the WUR within a first symbol comprises one of i) setting a value of the fifth bit in the bit order to signal the LPS request, and ii) setting a value of the sixth bit in the bit order to signal the WUR.

Embodiment 14: The method for communicating of embodiment 10, wherein: generating the OAM frame header comprises generating the first symbol to include a plurality of bits arranged according to a bit order, the plurality of bits including at least a first bit in the bit order, a second bit in the bit order that is adjacent to and between the first bit and a third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit; and generating the OAM frame header to include the information that signals the one of i) the LPS, and ii) the WUR within a first symbol comprises one of i) setting a value of the fifth bit in the bit order to signal the WUR, and ii) setting a value of the sixth bit in the bit order to signal the LPS request.

Embodiment 15: A first communication device, comprising: a physical layer (PHY) processor comprising a transceiver, the PHY processor being configured to perform PHY functions associated with a communication link including transmitting first frames to a second communication device via a communication medium corresponding to the communication link and receiving second frames from the second communication device via the communication medium; and a controller configured to: receive an Operation, Administration, and Maintenance (OAM) frame that was received by the PHY processor via the communication medium, the OAM frame having been transmitted to the first communication device from a second communication device via the communication medium, the OAM frame including i) OAM message content and ii) an OAM frame header outside of the OAM message content, and process the OAM frame header to determine whether the OAM frame header includes information that signals to the first communication device one of i) a low power sleep (LPS) request, and ii) a wake-up request (WUR).

Embodiment 16: The first communication device of embodiment 15, wherein: the OAM frame includes a plurality of symbols; and the controller is further configured to process a first symbol, among the plurality of symbols, that was received by the PHY processor first in time among the plurality of symbols, to determine whether the first symbol includes the information that signals the one of i) the LPS request, and ii) the WUR.

Embodiment 17: The first communication device of embodiment 16, wherein: the first symbol includes a plurality of bits; and the controller is further configured to determine i) whether a value of a first bit, among the plurality of bits, that is received by the PHY processor fifth in time among the plurality of bits is set to signal the LPS request, and ii) whether a value of a second bit, among the plurality of bits, that is received by the PHY processor sixth in time among the plurality of bits is set to signal the WUR.

Embodiment 18: The first communication device of embodiment 16, wherein: the first symbol includes a plurality of bits; and the controller is further configured to determine i) whether a value of a first bit, among the plurality of bits, that is transmitted fifth in time among the plurality of bits is set to signal the WUR request, and ii) whether a value of a second bit, among the plurality of bits, that is transmitted sixth in time among the plurality of bits is set to signal the LPS request.

Embodiment 19: The first communication device of embodiment 16, wherein: the first symbol includes a plurality of bits arranged according to a bit order, the plurality of bits including at least a first bit in the bit order, a second bit in the bit order that is adjacent to and between the first bit and a third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit; and the controller is further configured to determine i) whether a value of the fifth bit in the bit order is set to signal the LPS request, and ii) whether a value of the sixth bit in the bit order is set to signal the WUR.

Embodiment 20: The first communication device of embodiment 16, wherein: the first symbol includes a plurality of bits arranged according to a bit order, the plurality of bits including at least a first bit in the bit order, a second bit in the bit order that is adjacent to and between the first bit and a third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit; and the controller is further configured to determine i) whether a value of the fifth bit in the bit order is set to signal the WUR request, and ii) whether a value of the sixth bit in the bit order is set to signal the LPS request.

Embodiment 21: The first communication device of any of embodiments 15-20, wherein the controller comprises: a processor; and a memory coupled to the processor, the memory storing machine readable instructions that, when executed by the processor, cause the processor to: process the OAM frame header to determine whether the OAM frame header includes the information that signals to the first communication device the one of i) the LPS request, and ii) the WUR.

Embodiment 22: The first communication device of any of embodiments 15-20, wherein the controller comprises: hardware circuitry configured to process the OAM frame header to determine whether the OAM frame header includes the information that signals to the first communication device the one of i) the LPS request, and ii) the WUR.

Embodiment 23: A method for processing communications in a communication network, the method comprising: receiving, at a first communication device, an Operation, Administration, and Maintenance (OAM) frame from a second communication device via a communication medium, the OAM frame including i) OAM message content and ii) an OAM frame header outside of the OAM message content; and processing, at the first communication device, the OAM frame header to determine whether the OAM frame header includes information that signals to the first communication device one of i) a low power sleep (LPS) request, and ii) a wake-up request (WUR).

Embodiment 24: The method for processing communications of embodiment 23, wherein: the OAM frame includes a plurality of symbols; and processing the OAM frame header comprises processing a first symbol, among the plurality of symbols, that was received by the first communication device first in time among the plurality of symbols, to determine whether the first symbol includes the information that signals the one of i) the LPS request, and ii) the WUR.

Embodiment 25: The method for processing communications of embodiment 24, wherein: the first symbol includes a plurality of bits; and processing the OAM frame header comprises processing a first symbol, among the plurality of symbols, that was received by the first communication device comprises determining i) whether a value of a first bit, among the plurality of bits, that is received by the first communication device fifth in time among the plurality of bits is set to signal the LPS request, and ii) whether a value of a second bit, among the plurality of bits, that is received by the first communication device sixth in time among the plurality of bits is set to signal the WUR.

Embodiment 26: The method for processing communications of embodiment 24, wherein: the first symbol includes a plurality of bits; and processing the OAM frame header comprises processing a first symbol, among the plurality of symbols, that was received by the first communication device comprises determining i) whether a value of a first bit, among the plurality of bits, that is received by the first communication device fifth in time among the plurality of bits is set to signal the WUR, and ii) whether a value of a second bit, among the plurality of bits, that is received by the first communication device sixth in time among the plurality of bits is set to signal the LPS request.

Embodiment 27: The method for processing communications of embodiment 24, wherein: the first symbol includes a plurality of bits arranged according to a bit order, the plurality of bits including at least a first bit in the bit order, a second bit in the bit order that is adjacent to and between the first bit and a third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit; and processing the OAM frame header comprises processing a first symbol, among the plurality of symbols, that was received by the first communication device comprises determining i) whether a value of the fifth bit in the bit order is set to signal the LPS request, and ii) whether a value of the sixth bit in the bit order is set to signal the WUR.

Embodiment 28: The method for processing communications of embodiment 24, wherein: the first symbol includes a plurality of bits arranged according to a bit order, the plurality of bits including at least a first bit in the bit order, a second bit in the bit order that is adjacent to and between the first bit and a third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit; and processing the OAM frame header comprises processing a first symbol, among the plurality of symbols, that was received by the first communication device comprises determining i) whether a value of the fifth bit in the bit order is set to signal the WUR, and ii) whether a value of the sixth bit in the bit order is set to signal the LPS request.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A first communication device, comprising:
   a physical layer (PHY) processor comprising a transceiver, the PHY processor being configured to perform PHY functions associated with a communication link including transmitting first frames to a second communication device via a communication medium corresponding to the communication link and receiving second frames from the second communication device via the communication medium; and
   a controller configured to:
      generate an Operation, Administration, and Maintenance (OAM) frame that includes a plurality of symbols, and that includes i) OAM message content among the plurality of symbols and ii) an OAM frame header outside of the OAM message content, the OAM frame header including a first symbol and a second symbol among the plurality of symbols, the second symbol comprising a set of bits that indicates a meaning of the OAM message content, wherein generating the OAM frame comprises generating the first symbol of the OAM frame header to include a plurality of bits arranged according to a bit order, the plurality of bits including at least a first bit in the bit order, a second bit in the bit order that is adjacent to and between the first bit and a third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit,
one of i) set a value of the fifth bit in the bit order to signal a low power sleep (LPS) request, and ii) set a value of the sixth bit in the bit order to signal a wake-up request (WUR), and
prompt the PHY processor to transmit the OAM frame to the second communication device via the communication medium to signal to the second communication device the one of i) the LPS request, and ii) the WUR, including prompting the PHY processor to transmit the OAM frame so that the first symbol is transmitted first in time among the plurality of symbols.

2. The first communication device of claim 1, wherein the controller comprises:
a processor; and
a memory coupled to the processor, the memory storing machine readable instructions that, when executed by the processor, cause the processor to: generate the OAM frame that includes i) the OAM message content and ii) the OAM frame header.

3. The first communication device of claim 1, wherein the controller comprises:
hardware circuitry configured to generate the OAM frame that includes i) the OAM message content and ii) the OAM frame header.

4. A method for communicating in a communication network, the method comprising:
generating, at a first communication device, an Operation, Administration, and Maintenance (OAM) frame that includes a plurality of symbols, and that includes i) OAM message content among the plurality of symbols and ii) an OAM frame header outside of the OAM message content, the OAM frame header including a first symbol and a second symbol among the plurality of symbols, the second symbol comprising a set of bits that indicates a meaning of the OAM message content, wherein generating the OAM frame comprises generating the first symbol of the OAM frame header to include a plurality of bits arranged according to a bit order, the plurality of bits including at least a first bit in the bit order, a second bit in the bit order that is adjacent to and between the first bit and third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit;
one of i) setting a value of the fifth bit in the bit order to signal a low power sleep (LPS) request, and ii) setting a value of the sixth bit in the bit order to signal a wake-up request (WUR); and
transmitting, by the first communication device, the OAM frame to a second communication device via a communication medium to signal to the second communication device the one of i) the LPS request, and ii) the WUR, including transmitting the first symbol first in time among the plurality of symbols.

5. A first communication device, comprising:
a physical layer (PHY) processor comprising a transceiver, the PHY processor being configured to perform PHY functions associated with a communication link including transmitting first frames to a second communication device via a communication medium corresponding to the communication link and receiving second frames from the second communication device via the communication medium; and
a controller configured to:
receive an Operation, Administration, and Maintenance (OAM) frame that was received by the PHY processor via the communication medium, the OAM frame having been transmitted to the first communication device from a second communication device via the communication medium, the OAM frame including a plurality of symbols, and further including i) OAM message content among the plurality of symbols and ii) an OAM frame header outside of the OAM message content, the OAM frame header including a first symbol and a second symbol among the plurality of symbols, the second symbol comprising a set of bits that indicates a meaning of the OAM message content, wherein the first symbol is received by the PHY processor first in time among the plurality of symbols, and wherein the first symbol includes a plurality of bits arranged according to a bit order, the plurality of bits including at least a first bit in the bit order, a second bit in the bit order that is adjacent to and between the first bit and a third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit, and
process the first symbol of the OAM frame header to determine one of i) whether a value of the fifth bit in the bit order is set to signal a low power sleep (LPS) request, and ii) whether a value of the sixth bit in the bit order is set to signal a wake-up request (WUR).

6. The first communication device of claim 5, wherein the controller comprises:
a processor; and
a memory coupled to the processor, the memory storing machine readable instructions that, when executed by the processor, cause the processor to: process the first symbol of the OAM frame header to determine the one of i) whether the value of the fifth bit in the bit order is set to signal the LPS request, and ii) whether the value of the sixth bit in the bit order is set to signal the WUR.

7. The first communication device of claim 5, wherein the controller comprises:
hardware circuitry configured to process the first symbol of the OAM frame header to determine the one of i) whether the value of the fifth bit in the bit order is set to signal the LPS request, and ii) whether the value of the sixth bit in the bit order is set to signal the WUR.

8. A method for processing communications in a communication network, the method comprising:
receiving, at a first communication device, an Operation, Administration, and Maintenance (OAM) frame from a second communication device via a communication medium, the OAM frame including a plurality of symbols, and including i) OAM message content among the plurality of symbols and ii) an OAM frame header outside of the OAM message content, the OAM frame header including a first symbol and a second symbol among the plurality of symbols, the second symbol comprising a set of bits that indicates a meaning of the OAM message content, wherein receiving the OAM frame comprises receiving the first symbol first in time among the plurality of symbols, and the first symbol including a plurality of bits arranged according to a bit order, the plurality of bits including at least a first bit in the bit order, a second bit in the bit order that is adjacent to and between the first bit and a third bit in the bit order, a fourth bit in the bit order that is adjacent to and between the third bit and a fifth bit in the bit order, a sixth bit in the bit order that is adjacent to and between the fifth bit and a seventh bit in the bit order, and an eighth bit in the bit order that is adjacent to the seventh bit; and processing, at the first communication device, the first symbol of the OAM frame header to determine one of i) whether a value of the fifth bit in the bit order is set to signal a low power sleep (LPS) request, and ii) whether a value of the sixth bit in the bit order is set to signal a wake-up request (WUR).

* * * * *